Patented May 18, 1948

2,441,560

UNITED STATES PATENT OFFICE 2,441,560

Δ₁-ANDROSTENDIONE AND A PROCESS OF MAKING THE SAME

Adolf Butenandt, Berlin-Dahlem, Germany, assignor to Schering Corporation, Bloomfield, N. J., a corporation of New Jersey No Drawing. Application July 30, 1940, Serial No. 348,450. In Germany August 2, 1939

11 Claims. (Cl. 260—397.3)

This invention relates to Δ₁-3-keto steroids, and particularly to Δ₁-androstendione, and to a process of making the same.

It is already known that on treating 3-oxo derivatives of steroids, in which the nuclei A and B are connected with each other in trans-position according to Formula I, with one mol of halogen, such as bromine, preferentially 2-halogen derivatives of said ketones corresponding to Formula II are obtained. By this method, among others, 2-bromo cholestanone (IIa), 2-bromo-3-oxo bis-nor-allo cholenic acid (IIb) 2-bromo-allo-pregnandione (IIc) and 2-bromo-androstandione (IId) have been prepared and characterized.

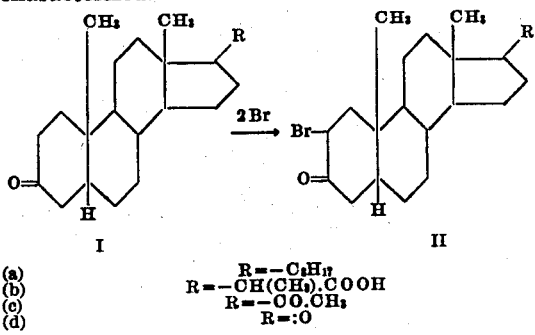

(a)  R = —C₈H₁₇
(b)  R = —CH(CH₃).COOH
(c)  R = —CO.CH₃
(d)  R = :O

It is further known that on treating said bromo ketones with agents capable of splitting off halogen hydride, for example, with potassium acetate in a solution of glacial acetic acid, α,β-unsaturated ketones are obtained, which have been regarded as Δ₁-unsaturated derivatives of steroids corresponding to Formula III:

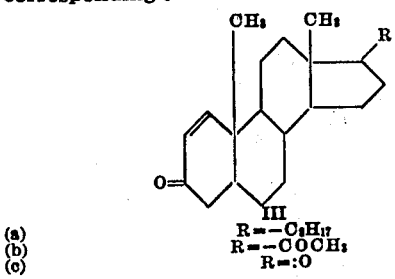

(a)  R = —C₈H₁₇
(b)  R = —COOH₃
(c)  R = :O

Now, it has been found that Δ₁-unsaturated steroid ketones-3 of another structure than that hitherto known are obtained from said 2-halogenated 3-keto steroids by splitting off halogen hydride, such as hydrogen bromide, at elevated temperature in the presence of higher boiling bases of the pyridine group, especially of collidine.

Thus, on boiling 2-bromo androstandione with collidine the Δ₁-androstendione of M. P. 138-139° C. is obtained. The same compound is also formed on boiling 2-bromo-cholestanone with collidine, whereby Δ₁-cholestenone of M. P. 95° C. is obtained, and subsequently splitting off the side chain in 17-position by known methods, thereby yielding a keto group in 17-position. Likewise by boiling 2-bromo-allo-pregnandione with collidine Δ₁-allo-pregnendione is obtained which also may be transformed into Δ₁-androstendione of M. P. 138-139° C. by degradation methods known per se. In the same manner other Δ₁-unsaturated steroid ketones may be prepared and converted into Δ₁-androstendione.

This compound has an excellent physiological activity, for it has proved to be a highly active male sex hormone. On testing the same according to Butenandt and Tscherning by subcutaneous injection of its solution in sesame oil, two times 80γ cause an increase of the area of the capon's comb of about 20%. In the smear test according to Fussgänger 5 times 0.5γ directly applied on the capon's comb were sufficient to cause an increase of the area of the comb of about 30%. Thus, while, on testing this product according to Butenandt in subcutaneous application, the activity of Δ₁-androstendione is about ⅓ of the activity of testosterone, it belongs to the most active compounds of the androsterone series hitherto known when tested according to Fussgänger.

The following examples illustrate the invention without, however, limiting the same to them.

Example 1

2.68 gs. of 2-bromo-cholestanone are boiled with 20 ccs. of collidine for 2 hours. After cooling, the solution is poured into dilute hydrochloric acid and extracted with ether. The ethereal solution is washed with dilute hydrochloric acid, then with water, dried with sodium sulfate and concentrated by evaporation. The oily residue crystallizes on cooling. It is recrystallized from acetone or from alcohol. From dilute acetone or alcohol the Δ₁-cholestenone forms long needles of M. P. 95° C. and shows a specific rotation in alcohol of $(\alpha)_D^{20} = +64.5°$. It shows an absorption in ultra-violet light of λ max.: 230 mμ, ε=10,800. By degradation of the side chain in 17-position by known means it is transformed to Δ₁-androstendione-3,17.

Example 2

320 mgs. of 2-bromo-allo-pregnandione are refluxed for 2½ hours with 4 ccs. of collidine. After cooling, the collidine hydrobromide separated is removed by filtration and washed with ether. The filtrate is mixed with dilute hydrochloric acid and extracted with ether. The ethereal solution is washed with dilute hydrochloric acid and with water, dried with sodium sulfate and evaporated. The residue is recrystallized from alcohol and yields 130 mgs. of $\Delta_1$-allo-pregnendione of M. P. 192–196° C. By repeated recrystallisation the melting point rises to 201–203° C. This substance when mixed with $\Delta_{16}$-allo-pregnendione, shows a depression of the melting point of about 30° C. It may be transformed into $\Delta_1$-androstendione by known methods.

*Example 3*

685 mgs. of 2-bromo-androstandione-3,17 are refluxed with 7 ccs. of collidine for 2 hours. After cooling, the solution is poured into 2 N hydrochloric acid and extracted with ether. The ethereal solution is washed several times with dilute hydrochloric acid and with water. After evaporation, the residue forms a yellow oil, which crystallises on treating with a small amount of acetone. After recrystallisation from hexane and from dilute acetone 214.2 mgs. of $\Delta_1$ androstendione-3,17 are obtained of M. P. 138–139° C. in a yield of about 40%. Its specific rotation is $(\alpha)_D^{23} = +148.5°$. Its absorption spectrum $\lambda$ max.=230 m$\mu$ in alcohol, $\epsilon$=10,800. 36 mgs. of $\Delta_1$-androstendione-3,17 are heated with hydroxylamine-acetate, prepared from 80 mgs. of hydroxylamine hydrochloride and 120 mgs. of sodium acetate, for 2 hours in alcohol. The dioxime formed is precipitated from the mixture by addition of water and recrystallized from dilute alcohol. Yield 14.2 mgs. of $\Delta_1$-androstendione-3,17-dioxime of M. P. 258–264° C. with decomposition.

*Example 4*

813 mgs. of 2-bromo-androstanol-17-one-3-acetate of M. P. 177–178° C. are boiled with 4 ccs. of collidine for 1 hour. After cooling, the mixture is poured into 70 ccs. of 2 N hydrochloric acid and extracted with ether. The ethereal solution is washed with N hydrochloric acid, then with water and dried. The remainder after evaporation is a darkly coloured oil. It is dissolved in hexane and filtered through aluminium oxide according to Brockmann. From the hexane filtrate and from the benzene extract a colourless residue is obtained consisting of $\Delta_1$-androstenol-17-one-3-acetate which crystallizes from dilute acetone in a yield of 419.5 mgs. M. P. 117–118° C.

For purification it is sublimated under 12 mm. pressure at about 220° C. and recrystallised from dilute acetone. Then its melting point is 122° C. and its specific rotation $(\alpha)_D^{23} = +47.2°$ in alcohol.

58.5 mgs. of said compound are boiled for 30 minutes with 20 ccs. of 0.5 N potassium hydroxide solution in alcohol in order to saponify the same. The solution is diluted with water, neutralized and extracted with ether. The residue from the ethereal solution is recrystallized from a mixture of acetone and hexane and from dilute acetone. Yield 28.6 mgs. of $\Delta_1$-androstenol-17-one-3, leaflets of M. P. 150° C. Specific rotation $(\alpha)_D^{19}=+53.3°$ in alcohol. Absorption spectrum $\lambda$ max.=230 m$\mu$ in alcohol. $\epsilon$=10,000.

On testing according to Fussgänger on the capon's comb, 5 times 0.5 $\gamma$ are sufficient to cause an increase of the area of the comb of 30%. Tested according to Butenandt and Tscherning 2 injections of 300 $\gamma$ each cause an increase of the area of the comb of about 20%. 8 times 250 $\gamma$ injected subcutaneously restore the seminal vesicles of infantile male rats to the stage of secretion. This shows, that $\Delta_1$-androstenolone belongs to the most active compounds of the androsterone series.

30 mgs. of $\Delta_1$-androstenol-17-one-3 are oxidized in 5 ccs. of glacial acetic acid with 10.4 mgs. of chromic acid for 90 minutes at room temperature. Then the mixture is poured into water and extracted with ether. From the neutral parts by recrystallisation from dilute acetone 8.1 mgs. of $\Delta_1$-androstendione-3,17 are recovered melting at 138–139° C. and showing a specific rotation of $(\alpha)_D^{19}=+144.0°$ in alcohol.

*Example 5*

4 gs. of 2-bromo cholestanone are boiled with freshly distilled 2,4-dimethyl pyridine of boiling point 155–156° C. After a short period of time the mixture begins to become greenish, but no crystals precipitate at boiling temperature. On cooling, the dimethyl pyridinium hydrobromide, which is readily soluble in water, crystallizes. The mixture is diluted with ether and thoroughly shaken with dilute hydrochloric acid. Then the ethereal solution is washed with sodium carbonate solution and water. The dark residue remaining after evaporation of the ether is distilled in a high vacuum at 160–180° C. The pale yellow distillate crystallizes from alcohol. It is the $\Delta_1$-cholestenone, melting at 95° C. after repeated recrystalisation.

It may be stated that the constitution of the $\Delta_1$-keto-3-steroids obtained according to this invention is not absolutely certain. Since these compounds, however, show an absorption in the ultraviolet of $\lambda$ max.=230 m$\mu$, $\epsilon$=10,000 in ethanol, which is characteristic for a $\Delta_1$-unsaturated steroidketone they may be defined as true $\Delta_1$-compounds, while the hitherto known $\Delta_1$-keto-3-steroids may be termed "hetero-$\Delta_1$-keto-3-steroids."

Of course, many changes and variations may be made in the reaction conditions, the starting materials employed, the solvents used, the reaction temperature and duration, the methods of isolating and purifying the reaction products, and so forth by those skilled in the art in accordance with the principles set forth herein and in the claims annexed hereto.

What I claim is:

1. Process for the manufacture of $\Delta_1$-steroidketones-3 comprising heating a 2-halogeno steroid ketone-3 with a higher boiling pyridine base at substantially the boiling point of such base, said base being a member of the group consisting of collidine and 2,4-dimethyl pyridine, and recovering the $\Delta_1$-steroid ketone-3 from the reaction product.

2. Process according to claim 1, wherein the 2-halogeno steroid ketone-3 is boiled with collidine.

3. Process according to claim 1, wherein 2-bromo-allo pregnandione is employed as starting material.

4. Process according to claim 1, wherein 2-halogeno androstanol-17-one-3 is employed as starting material.

5. Process for the manufacture of $\Delta_1$-androstendione comprising heating a 2-halogeno-androstandione-3,17 with collidine at substantially the boiling point of the latter, and isolating the $\Delta_1$-androstandione so obtained.

6. Process for the manufacture of $\Delta_1$-androstendione-3,17, which comprises heating 2-bromoandrostandione-3,17 with collidine at substantially the boiling point of the latter, and isolating the Δ₁-androstendione-3,17 so obtained.

7. Process for the manufacture of Δ₁-3-keto androstenes, which comprises heating a 2-bromo-3-keto androstane with collidine at substantially the boiling point of the latter, and recovering the Δ₁-3-keto compound from the reaction product.

8. Δ₁-androstendione-3,17 of M. P. 138–139° C. and of high physiological activity as a male sexual hormone, and having a specific rotation of $(\alpha)_D^{19} = +144.0°$ in alcohol, its dioxime melting at about 258–264° C. with decomposition, its steric configuration corresponding to that produced by the action of a member of the group consisting of collidine and 2,4 dimethyl pyridine at its boiling point on the corresponding 2-bromo compound having a single bond between $C_1$ and $C_2$.

9. Process for the manufacture of Δ₁-androstendione comprising heating a 2-halogeno steroid ketone-3 having a side chain in the 17-position with a higher boiling pyridine base at substantially the boiling point of the latter, said base being a member of the group consisting of collidine and 2,4-dimethyl pyridine, splitting off the side chain in known manner to replace the same with ketonic oxygen, and isolating the Δ₁-androstendione so obtained.

10. Process for the manufacture of Δ₁-androstendione comprising heating a 2-halogeno-androstandione-3.17 with a higher boiling pyridine base at substantially the boiling point of the latter, said base being a member of the group consisting of collidine and 2,4-dimethyl pyridine, and isolating the Δ₁-androstendione so obtained.

11. Process for the manufacture of Δ₁-androstendione-3,17 which comprises heating 2-bromo-androstandione-3,17 with a higher boiling pyridine base at substantially the boiling point of the latter, said base being a member of the group consisting of collidine and 2,4-dimethyl pyridine, and isolating the Δ₁-androstendione-3,17 so obtained.

ADOLF BUTENANDT.

REFERENCES CITED

The following references are of record in the file of this patent:

UNITED STATES PATENTS

| Number | Name | Date |
|---|---|---|
| 2,153,700 | Serini | Apr. 11, 1939 |
| 2,260,328 | Miescher et al. | Oct. 28, 1941 |
| 2,305,602 | Butenandt | Dec. 22, 1942 |

OTHER REFERENCES

Marker, "Jour. Am. Chem. Soc.," vol. 61, pages 1333–1337, June 1939.